United States Patent
Chen et al.

(10) Patent No.: US 8,689,430 B1
(45) Date of Patent: Apr. 8, 2014

(54) METHOD FOR PROVIDING A PERPENDICULAR MAGNETIC RECORDING (PMR) HEAD

(75) Inventors: Yingjian Chen, Fremont, CA (US); Kyusik Sin, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1790 days.

(21) Appl. No.: 11/605,635

(22) Filed: Nov. 29, 2006

(51) Int. Cl.
*G11B 5/127* (2006.01)
*H04R 31/00* (2006.01)

(52) U.S. Cl.
USPC .......... 29/603.16; 29/603.12; 29/603.13; 29/603.14; 29/603.15; 29/603.18; 360/321; 360/324.2; 451/5; 451/8; 451/10; 451/41

(58) Field of Classification Search
USPC .......... 29/603.1, 603.12, 603.15, 603.16, 29/603.18; 360/321, 324.2; 451/5, 8, 10, 451/28, 36, 37, 41
See application file for complete search history.

(56) References Cited

U.S. PATENT DOCUMENTS

| | | | |
|---|---|---|---|
| 6,954,340 B2 | 10/2005 | Shukh et al. | |
| 7,715,147 B2 * | 5/2010 | Feldbaum et al. | 360/125.3 |
| 2005/0068669 A1 | 3/2005 | Hsu et al. | |
| 2006/0002020 A1 | 1/2006 | Pokhil et al. | |
| 2006/0044681 A1 | 3/2006 | Le et al. | |
| 2006/0044682 A1 | 3/2006 | Le et al. | |
| 2006/0082924 A1 | 4/2006 | Etoh et al. | |
| 2007/0268625 A1 * | 11/2007 | Jiang et al. | 360/126 |

* cited by examiner

*Primary Examiner* — Paul D Kim

(57) ABSTRACT

A method and system for providing a perpendicular magnetic recording (PMR) head are disclosed. A PMR pole having a bottom and a top wider than the bottom is provided. The PMR pole may be formed by depositing a PMR pole layer, then removing part of the PMR pole layer, leaving the PMR pole. The PMR pole may also be provided by forming a trench having the desired profile in a photoresist layer, depositing the PMR pole layer, then removing the photoresist layer, leaving the PMR pole in the location of the trench. A side gap is deposited over the PMR pole. A side shield is provided on the side gap. A planarization that removes part of the side shield on the PMR pole is performed. A top gap is provided on the PMR pole, substantially covering the entire PMR pole. A top shield is provided on the top gap.

12 Claims, 8 Drawing Sheets

METHOD FOR PROVIDING A PERPENDICULAR MAGNETIC RECORDING (PMR) HEAD

FIELD OF THE INVENTION

The present invention relates to magnetic recording technology, and more particularly to a method and system for providing perpendicular magnetic recording heads having wrap around shields.

BACKGROUND

Conventional perpendicular magnetic recording (PMR) heads may be unshielded or shielded. Although easier to fabricate and having higher write fields, unshielded heads have a low gradient field. Such a low gradient field results in less sharp transitions and lower signal to noise ratios, which are undesirable. Consequently, shielding is typically provided in conventional PMR heads.

FIG. 1 depicts a portion of a conventional PMR head 10, as viewed from the air-bearing surface (ABS). The conventional PMR head 10 is a shielded head. The conventional PMR head 10 is typically part of a merged head including the PMR head 10 and a read head (not shown) and typically resides on a slider (not shown). For clarity, the conventional PMR head 10 is not drawn to scale.

The conventional PMR head 10 includes a conventional first pole 12, alumina insulating layer 14, alumina underlayer 16 that may be considered part of the alumina insulating layer 14, a conventional PMR pole 18 that typically includes a seed layer (not shown), insulating layer 20, shield gap 26, and top shield 28. Note that in certain other embodiments, the top shield 28 may also act as pole during writing using the conventional PMR head 10. The conventional PMR pole 18 is surrounded by insulating layer 20. Similarly, the top shield 28 is surrounded by another insulating layer (not shown). The conventional PMR pole 18 has sidewalls 22 and 24. In conventional applications, the height of the conventional PMR pole 18 is typically less than approximately three-tenths micrometer. The conventional PMR pole 18 also has a negative angle such that the top of the conventional PMR pole 18 is wider than the bottom of the conventional PMR pole 18. Stated differently, the angle θ of the sidewalls is less than ninety degrees in the conventional PMR pole 18 of FIG. 1. A pole having this height and shape is desirable for use in PMR applications.

Because the conventional PMR head 10 utilizes a top shield 28, the gradient field is improved. In addition, the net magnetic field from the conventional PMR head 10 is at an angle to the perpendicular direction. However, performance of the conventional PMR head 10 may still suffer due to stray side fields. Such stray side fields may cause side erasure of adjacent tracks. In addition, such a wider field profile may give rise to increased magnetic track width. Consequently, the reduced track pitch required for ultrahigh density recording may not be achieved.

FIG. 2 depicts a portion of a conventional PMR head 10', as viewed from the air-bearing surface (ABS). The conventional PMR head 10' is a shielded head that includes side shields. The conventional PMR head 10' is typically part of a merged head including the PMR head 10 and a read head (not shown) and typically resides on a slider (not shown). For clarity, the conventional PMR head 10' is not drawn to scale.

The conventional PMR head 10' includes components that are analogous to those in the conventional PMR head 10. Such components are labeled similarly. Thus, the conventional PMR head 10' includes a conventional first pole 12', alumina insulating layer 14', alumina underlayer 16' that may be considered part of the alumina insulating layer 14', a conventional PMR pole 18' that typically includes a seed layer (not shown), shield gap 26', and shield 28'. The shield 28' includes top shield 28A and side shield 28B portions. Similarly, the shield gap 26' includes top gap 26A and side gap 26B portions.

FIG. 3 is a flow chart depicting a conventional method 50 for fabricating the conventional PMR head having a side shield. For simplicity, some steps are omitted. The conventional method 50 is described in the context of the conventional PMR head 10'. The conventional method 50 starts during formation of the PMR pole 18'. The PMR pole 18' is defined, via step 52. The shield gap 26' is deposited, via step 54. Thus, both the top gap 26A and the side gap 26B are deposited in step 54. A photoresist mask (not shown) for the shield 28' is provided, via step 56. The shield 28' is plated, via step 58. The photoresist mask used for the shield 28' is then removed, via step 60. Fabrication of the PMR head 10' is then completed, via step 62. Thus, the PMR head 10' may be formed.

Although the conventional method 50 may be used to fabricate the conventional PMR head 10', there are significant drawbacks. For example, the throat height (length perpendicular to the ABS) of the top shield portion 28A and the side shield portion 28B are the same. Similarly, the thicknesses of the top shield gap portion 26A and the side shield gap portions 26B are the same. This may adversely affect performance of the conventional PMR head 10'. In addition, the photolithography carried out for forming the resist masks in step 56 takes place on the pole 18'. As a result, the thickness of the mask may be uneven. Poor edge definition and location may thus result.

Accordingly, what is needed is an improved method for fabricating a PMR head.

SUMMARY

A method and system for providing a perpendicular magnetic recording head are disclosed. The method and system include forming a perpendicular magnetic recording pole having a bottom and a top wider than the bottom. The method and system also include depositing a side gap over the PMR pole and providing a side shield on the side gap. The method and system also include performing a planarization step that removes a portion of the side shield on the PMR pole. The method and system also include providing a top gap on the PMR pole. The top gap covers substantially only the PMR pole. The method and system further include providing a top shield.

DETAILED DESCRIPTION OF THE PREFERRED EMBODIMENTS

Figure 1:
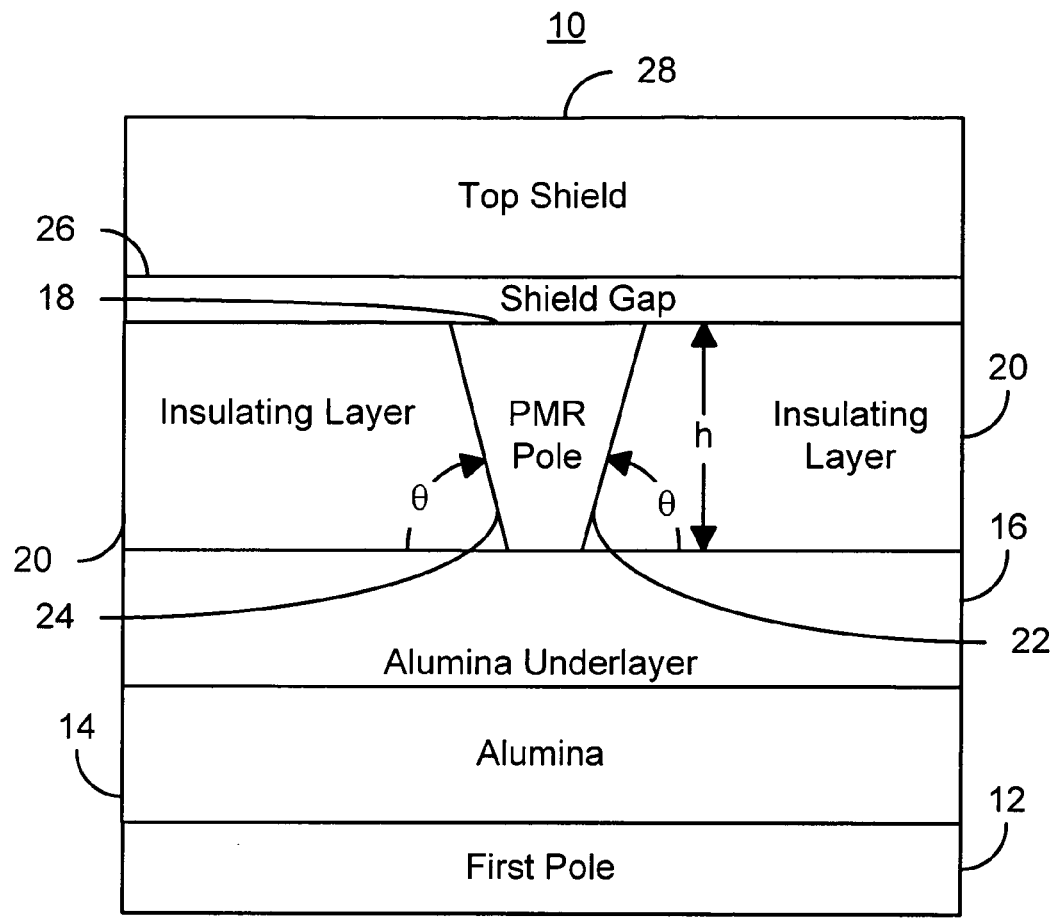
FIG. 1 is diagram depicting a conventional PMR head.
Figure 2:
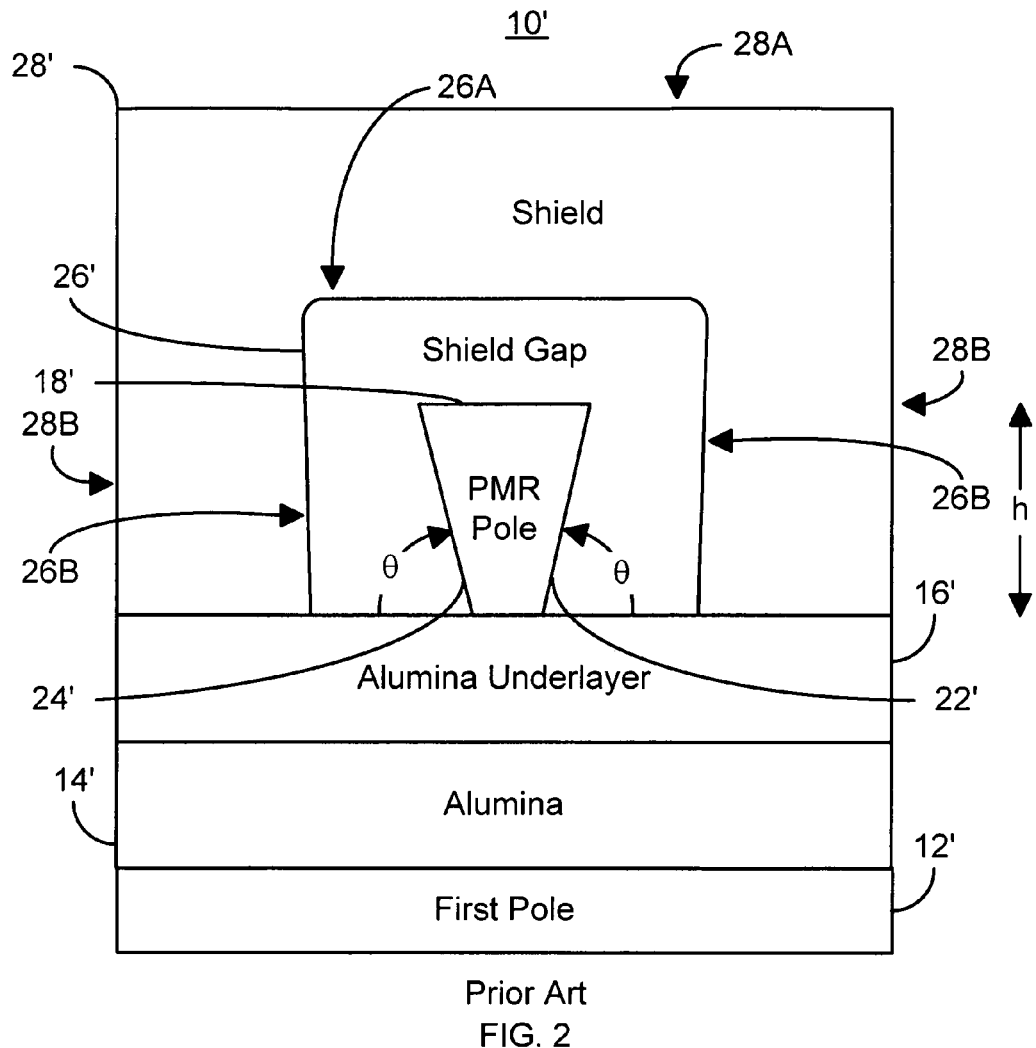
FIG. 2 is diagram depicting another conventional PMR head.
Figure 3:
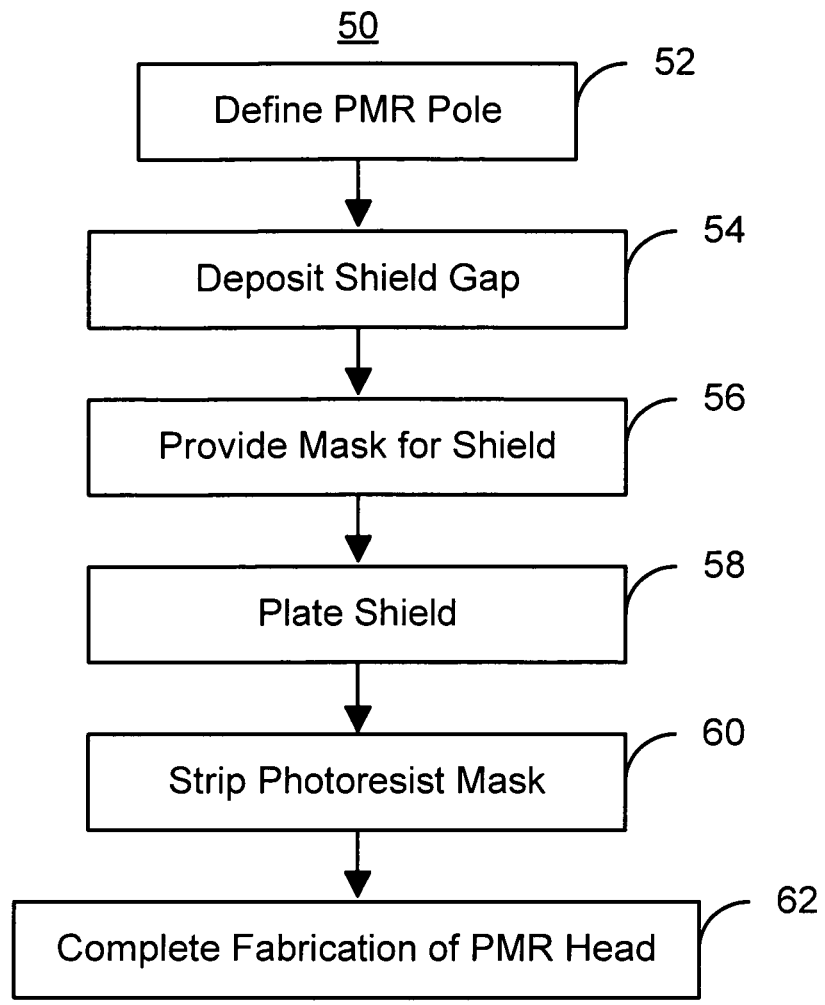
FIG. 3 is a flow chart depicting a conventional method for fabricating a PMR head having side shields.
Figure 4:
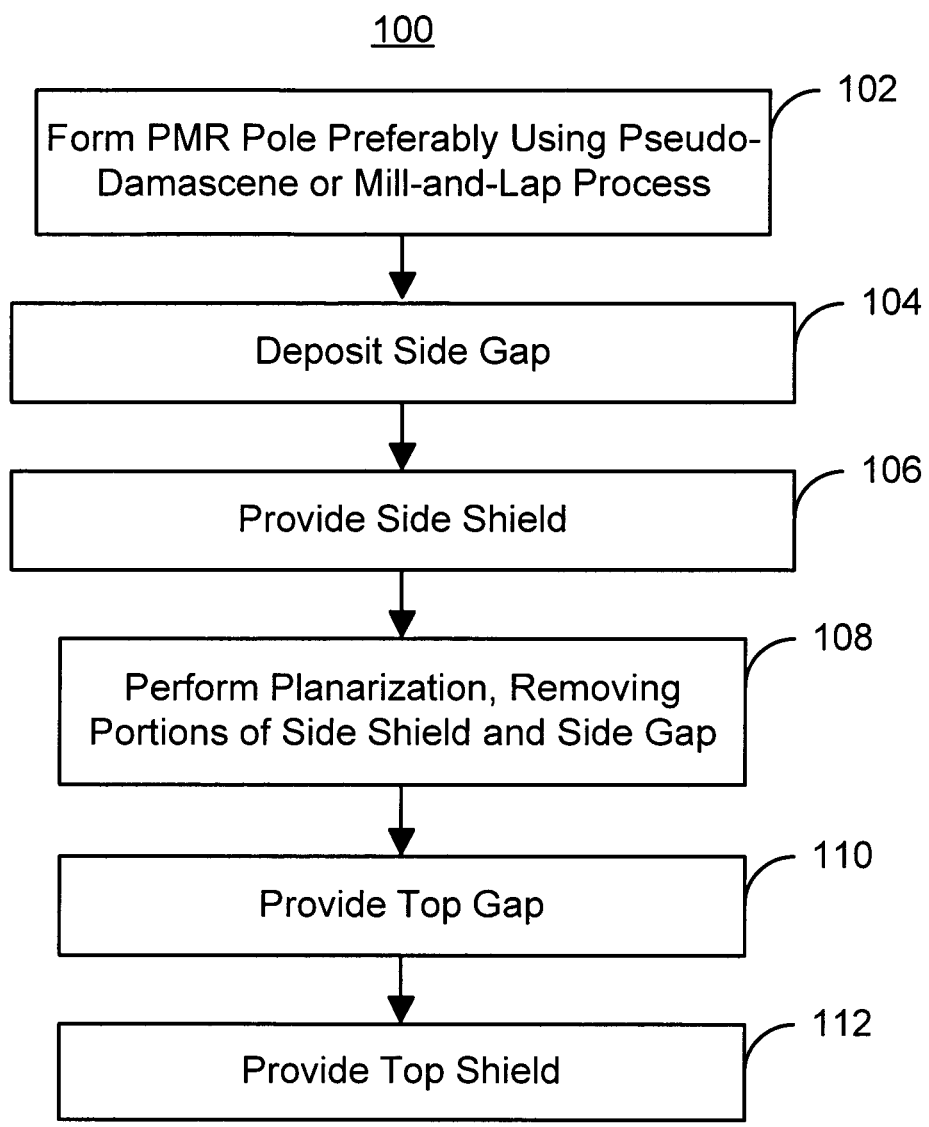
FIG. 4 is a flow chart depicting one embodiment of a method for fabricating a PMR head.
Figure 5A:
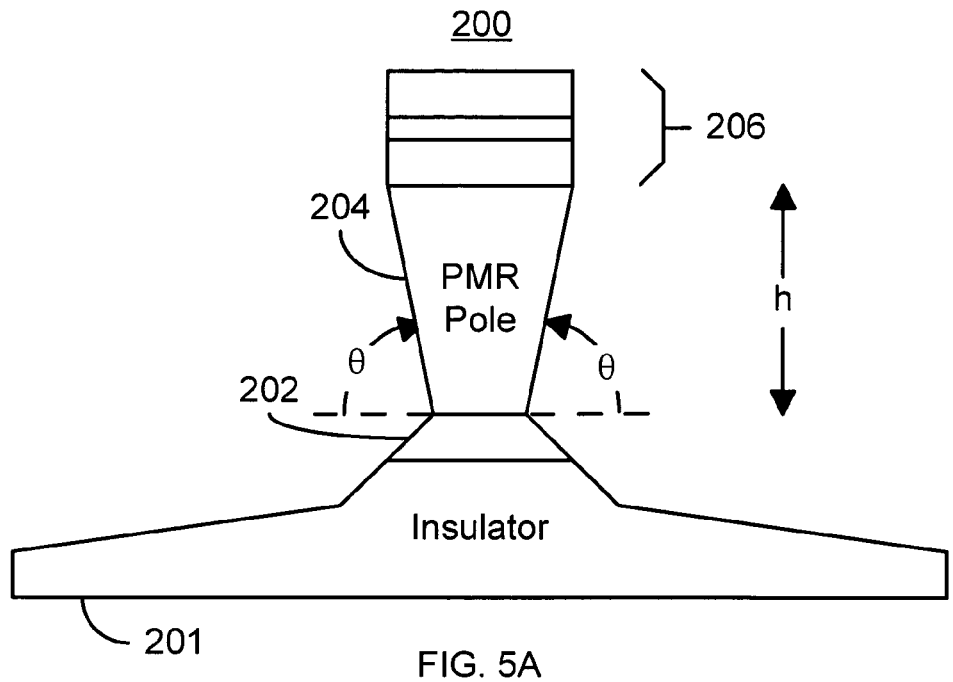
FIGS. 5A-5E are diagrams depicting the ABS views of an exemplary embodiment of a perpendicular magnetic recording head during fabrication.
Figure 5B:
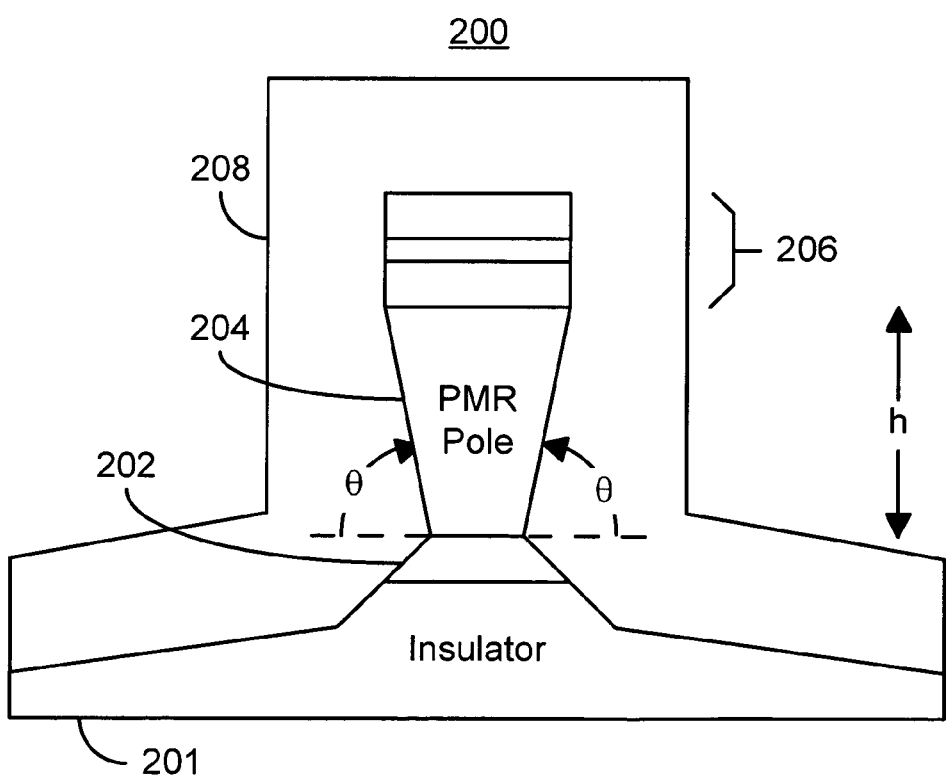
Figure 5C:
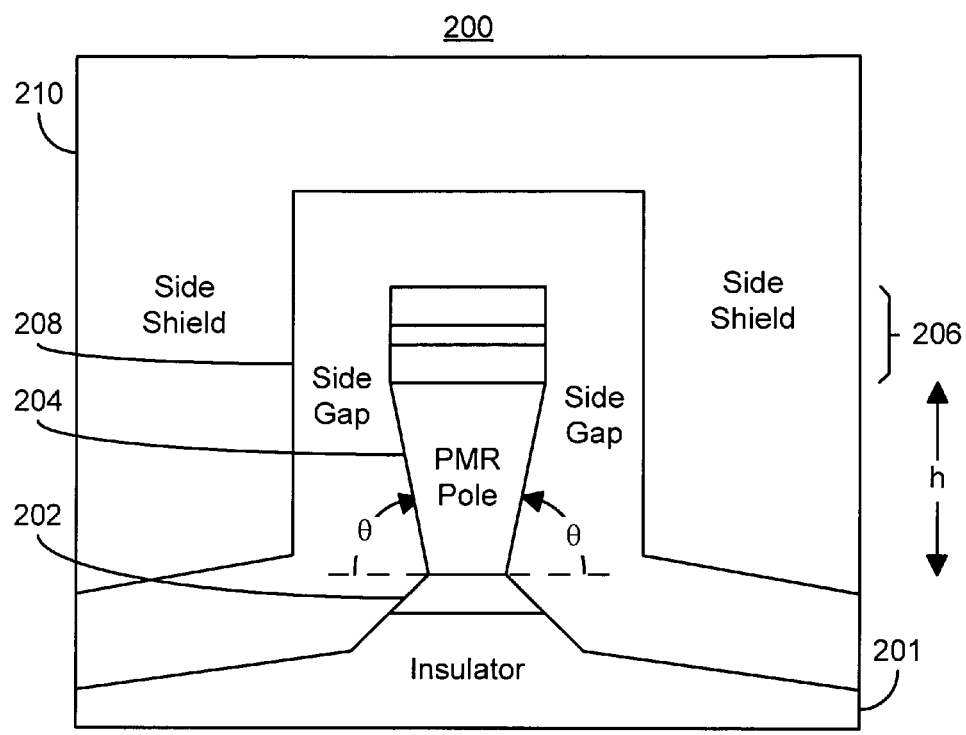
Figure 5D:
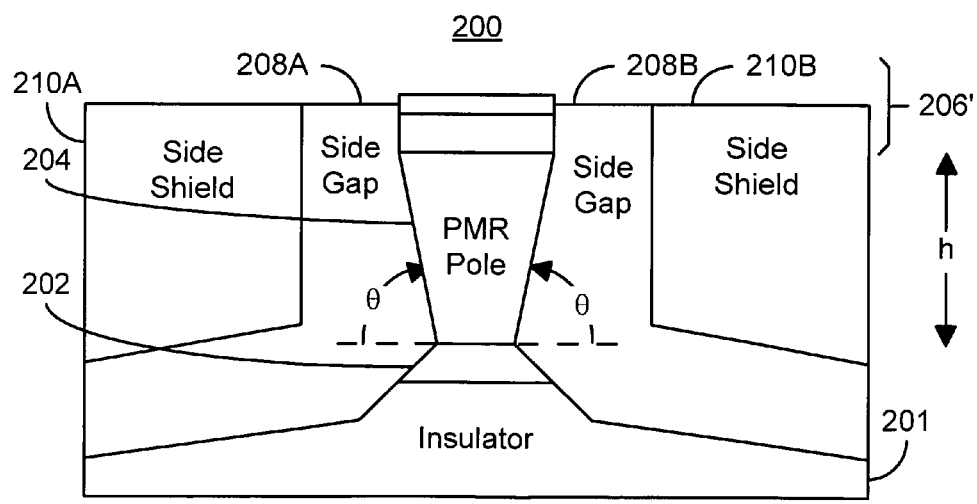
Figure 5E:
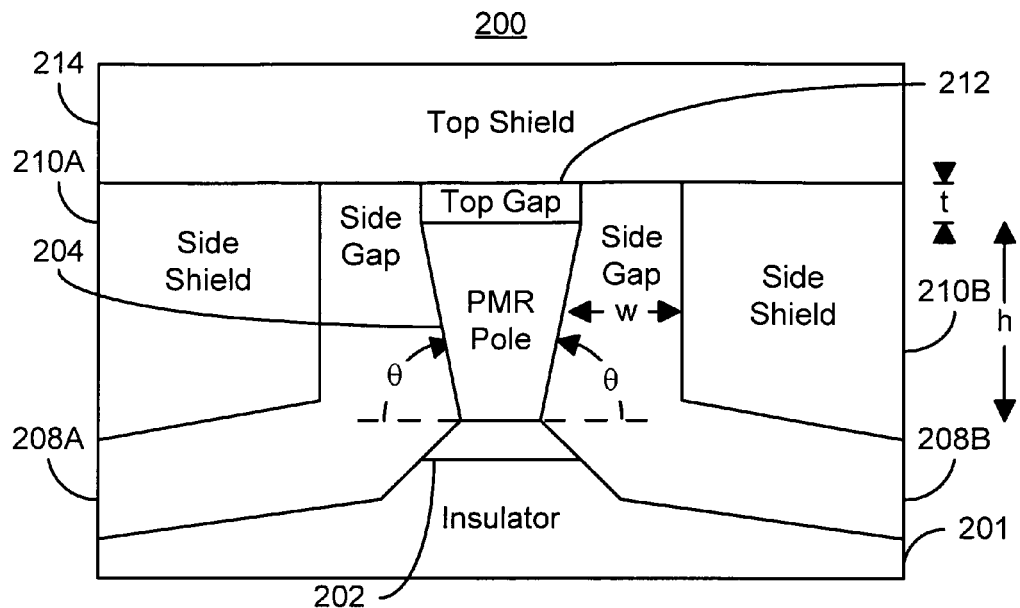

FIG. 4 is a flow chart depicting one embodiment of a method 100 for fabricating a PMR head. FIGS. 5A-5E are diagrams depicting the ABS views of an exemplary embodiment of a PMR head 200 during fabrication. Referring to FIGS. 4-5E, the method 100 is described in the context of the PMR head 200. For simplicity, some steps may be omitted. In addition, for clarity, the PMR head 200 is not drawn to scale. The PMR head 200 is preferably part of a merged head that also includes a read head (not shown) and resides on a slider (not shown). The method 100 also preferably commences after formation of a first pole and formation of layers that will reside under a second pole. For clarity, the PMR head 200 is not drawn to scale.

A PMR pole is formed, via step 102. In a preferred embodiment, the pole is formed using one of two processes. One process used is termed a pseudo-damascene process. In such a process, step 102 preferably includes depositing a layer of photoresist, providing a trench having a desired shape for the PMR pole in the photoresist, depositing the PMR pole in the trench, and removing the photoresist. The other such process is termed a mill-and-lap process. In the mill-and-lap process, material for the PMR pole is plated, a mask that covers the PMR pole is formed, and the PMR pole is defined (or trimmed) using the mask, preferably using an ion mill. In forming the PMR pole in either the pseudo damascene or the mill-and-lap process, multiple layers may be provided. For example seed and/or glue layers may be provided below the PMR pole. In the mill-and-lap process, a planarization stop layer may be provided on the PMR pole layer. In the pseudo-damascene process, a planarization stop layer is preferably not used. Instead, support structures spaced apart from the PMR pole may be used during a planarization. In addition, the PMR pole may be formed in step 102 on a metal underlayer, directly on an insulator, or on another layer. The PMR pole may be sputter deposited or electroplated using high moment materials. FIG. 5A depicts one embodiment of a PMR head 200 after step 102 is performed. The PMR head 200 includes an insulator 201 that preferably resides on a first pole (not shown). In the embodiment shown, a metal underlayer 202 is used. The PMR pole 204 is also depicted. The PMR pole 204 is preferably trapezoidal in shape, having a top that is wider than the bottom. Multiple layers 206 may also have been provided on the PMR pole 204. However, in another embodiment, the layers 206 may not be used.

A side gap is deposited on the PMR pole 204, via step 104. Examples of processes used for depositing the side gap may include physical vapor deposition, collimated physical vapor deposition, ion beam deposition, atomic layer deposition, and chemical vapor deposition. In a preferred embodiment, the side gap is blanket deposited on the PMR head 100. Also in a preferred embodiment, atomic layer deposition is used in step 104. The side gap is preferably at least five hundred Angstroms thick and no more than two thousand Angstroms thick. The thickness of the side gap deposited in step 104 may be selected based on the design requirements of the PMR head 200. FIG. 5B depicts the PMR head 200 after deposition of the side gap 208. The side gap 208 may be insulating. In a preferred embodiment, the side gap 208 includes at least one of aluminum oxide, silicon oxide, silicon nitride, and tantalum oxide. Depending upon the process used, the thickness of the side gap 208 on the side walls of the PMR pole 204 may be different than the thickness on the top (horizontal portion) of the PMR pole 204. For example, physical vapor deposition and collimated physical vapor deposition may result in a side gap 208 that is thinner on the sidewalls than on the top of the PMR pole 204. Ion beam deposition, atomic layer deposition, and chemical vapor deposition may result in a side gap 208 that has almost the same thickness on the top of the PMR pole 204 as the sidewalls of the PMR pole 204. In addition, if other deposition techniques are used, the side gap 208 may have a different shape. For example, if conformal deposition techniques, such as atomic layer deposition, are used, the side gap may conform to shape of the PMR pole 204. In such an embodiment, the side walls of the side gap may have a negative angle similar to θ.

A side shield is deposited on the PMR head, via step 106. Step 106 may also include depositing seed layers for the side shield and forming a mask having an aperture in the region of the PMR pole 204. In a preferred embodiment, the side shield is plated. However, in another embodiment, another deposition method may be used. FIG. 5C depicts the PMR head 200 after step 106 is performed. Thus, the side shield 210 is shown. The layer for the side shield 210 encapsulates the PMR pole 204.

A planarization is performed, via step 108. In a preferred embodiment, a chemical mechanical planarization (CMP) is used. The planarization step removes a portion of the side shield 210 and exposes the stack for the PMR pole 204. In addition, the top portion of the side gap 208 is removed. FIG. 5D depicts the PMR head 200 after step 108 has been performed. Thus, side shields 210A and 210B remain. In addition, the stack including the PMR pole 204 has been exposed. A portion of the side gaps 208A and 208B are also exposed. In the embodiment shown, a portion of the top layer(s) 206 has been removed, leaving the layers 206'. In another embodiment, the layers 206' may be completely removed. A substantially flat surface 211 is also provided by the planarization.

A top gap is provided on the PMR pole, via step 110. The top gap may be formed of the same material as the side gaps 210A and 210B or may be formed of another material. In some embodiments, step 110 is performed when the PMR pole 204 is formed. In such an embodiment, the top gap may be formed under the planarization layer described above with respect to the mill-and-lap process. However, in another embodiment, the top gap 110 may be formed at a different time than the PMR pole 204. The top shield is provided, via step 112. The top shield is preferably formed by plating the shield. In addition, a seed layer and an etch to remove a portion of the top shield may be performed in step 112. However, another deposition method could be used. Fabrication of the PMR head 200 may then be completed, via step 114. FIG. 5E depicts the PMR head 200 after step 112 has been performed. Thus, the top gap 212 and the top shield 214 have been provided. In the embodiment shown, the top gap 212 covers substantially only the PMR pole 204. In the embodiment shown in FIG. 5E, the thickness, t, of the top gap 212 is different from the width, w, of the side gaps 208A and 208B. In one embodiment, the width, w, is at least twice the thickness, t. For example, in one embodiment, the side gaps 208A and 208B may be more than one hundred nanometers, while the top shield gap 212 may be fifty nanometers or less. In another embodiment, the width, w, is at least three times the thickness, t.

Thus, the method 100 may be used to provide the PMR head 200. Because they are formed separately, the top gap 212 and the side gaps 208A and 208B can be configured independently. Thus, the width of side gaps 208A and 208B can differ from the thickness of the top gap 212. More particularly, the width of the side gaps 208A and 208B may, for example, be two to three times the thickness of the top gap 212. Consequently, better magnetic performance can be achieved. In addition, because the planarization performed in step 108 results in a flat topology, the top shield 212 is provided on a relatively flat topology. Consequently, better edge definition and edge location control may be provided. In addition, the side shields 210A and 210B and the top shield 214 may be configured independently. As a result, the throat height (perpendicular to the page in FIGS. 5A-5E) of the top shield 214 may be set independently from the throat height of the side shields 210A and 210B. For example, the throat height of the top shield 214 may be set to 0.2 μm or less, while the throat height of the side shields 210A and 210B may be larger. Consequently, the desired field strength, gradient, and angle may be achieved while providing side shields for reducing inadvertent side erasure of adjacent tracks. Consequently, a reduced track pitch for ultrahigh density recording may be achieved. Furthermore, the method 100 may be relatively easily incorporated into existing methods for fabricating PMR heads. Thus, the benefits of the PMR head 200 may be achieved without radically altering existing fabrication methods.

Figure 6:
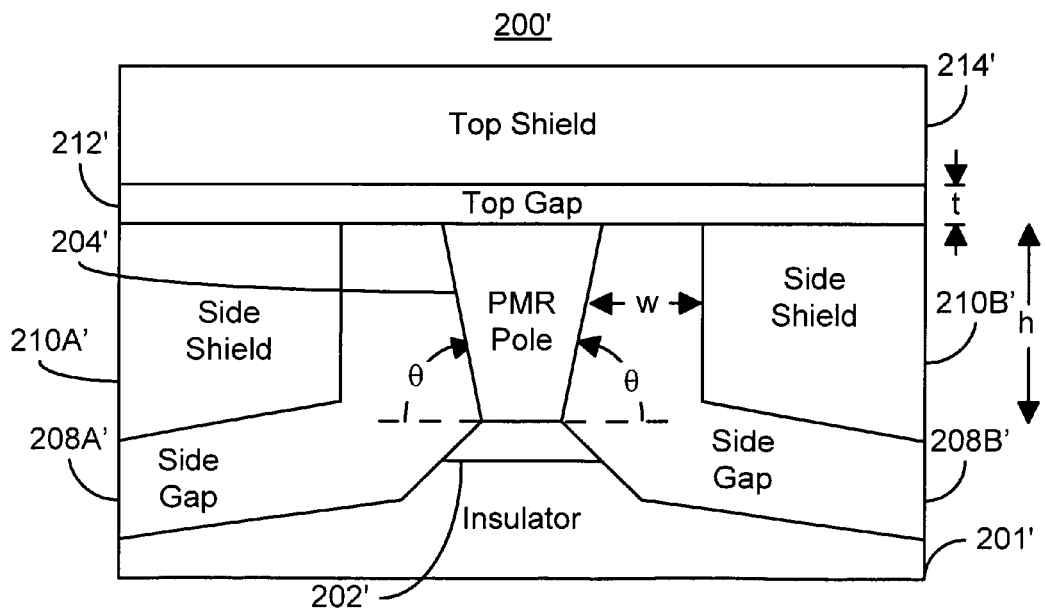
FIG. 6 is a diagram depicting the ABS views of another exemplary embodiment of a perpendicular magnetic recording head during fabrication.

FIG. 6 is a diagram depicting the ABS views of another exemplary embodiment of a PMR head 200' during fabrication. In addition, for clarity, the PMR head 200' is not drawn to scale. The PMR head 200' is preferably formed using the method 100. In addition, the PMR head 200' is analogous to the PMR head 200 and, therefore, has components that are labeled similarly. The PMR head 200' thus includes a PMR pole 204' that may be formed on a metal underlayer 202' and underlying insulator 201', side gaps 208A' and 208B', side shields 210A' and 210B', top gap 212' and top shield 214'. The PMR head 200' may also include additional layers 206'.

The top gap 212' in the PMR head 200' is fabricated in step 110 of the method 100. However, for the PMR head 200', the top gap 212' is configured to separate the top shield 214' from the side shields 210A' and 210B'. However, for the PMR head 200', the side gaps 208A' and 208B' can still be configured separately from the top gap 212'. Similarly, the side shields 210A' and 210B' may be configured separately. In addition, the topology of the PMR head 200' after formation of the top gap 212' and in preparation for providing the top shield 214' is quite flat. Consequently, the benefits of the PMR head 200 may also be achieved for the PMR head 200'.

Figure 7:
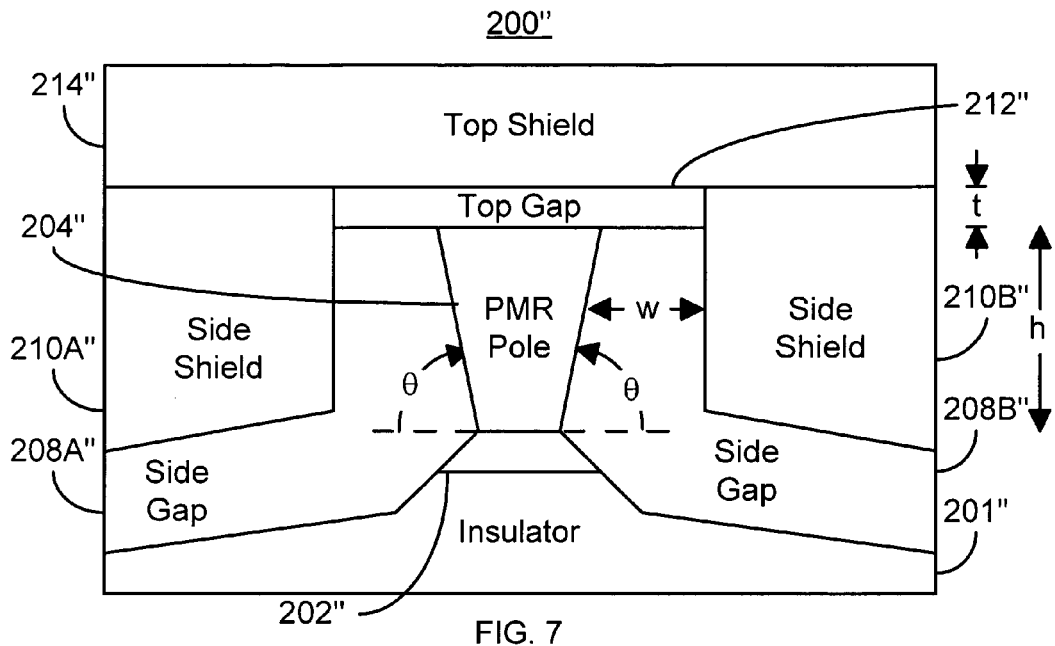
FIG. 7 is a diagram depicting the ABS views of another exemplary embodiment of a perpendicular magnetic recording head during fabrication.

FIG. 7 is a diagram depicting the ABS views of another exemplary embodiment of a PMR head 200" during fabrication. In addition, for clarity, the PMR head 200" is not drawn to scale. The PMR head 200" is preferably formed using the method 100. In addition, the PMR head 200" is analogous to the PMR head 200 and, therefore, has components that are labeled similarly. The PMR head 200" thus includes a PMR pole 204" that may be formed on a metal underlayer 202" and underlying insulator 201", side gaps 208A" and 208B", side shields 210A" and 210B", top gap 212" and top shield 214". The PMR head 200" may also include additional layers 206".

The top gap 212" in the PMR head 200" is fabricated in step 110 of the method 100. However, for the PMR head 200", the top gap 212" is configured extend over the side gaps 208A" and 208B" without separating the top shield 214" from the side shields 210A" and 210B". For the PMR head 200", the side gaps 208A" and 208B" can still be configured separately from the top gap 212". Similarly, the side shields 210A" and 210B" may be configured separately. In addition, the topology of the PMR head 200" after formation of the top gap 212" and in preparation for providing the top shield 214" is quite flat. Consequently, the benefits of the PMR heads 200 and 200' may also be achieved for the PMR head 200".

Figure 8:
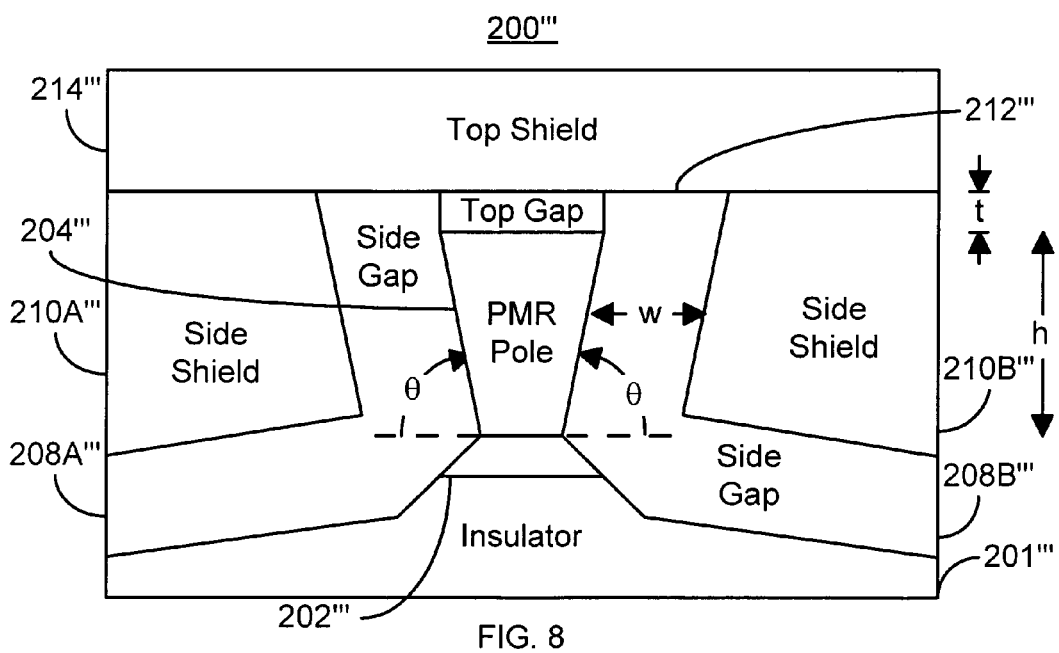
FIG. 8 is a diagram depicting the ABS views of another exemplary embodiment of a perpendicular magnetic recording head during fabrication.

FIG. 8 is a diagram depicting the ABS views of another exemplary embodiment of a PMR head 200''' during fabrication. For clarity, the PMR head 200''' is not drawn to scale. The PMR head 200''' is preferably formed using the method 100. In addition, the PMR head 200''' is analogous to the PMR head 200 and, therefore, has components that are labeled similarly. The PMR head 200''' thus includes a PMR pole 204''' that may be formed on a metal underlayer 202''' and underlying insulator 201''', side gaps 208A''' and 208B''', side shields 210A''' and 210B''', top gap 212''' and top shield 214'''. The PMR head 200''' may also include additional layers 206'''.

The side gaps 208A''' and 208B''' in the PMR head 200''' are deposited in step 104 of the method 100. For the PMR head 200''', a conformal deposition technique, such as atomic layer deposition, is used in step 104. Consequently, the sidewalls of the side gaps 208A''' and 208B''' have a negative angle that is similar to that of the PMR pole 204'''. The side gaps 208A''' and 208B''' can still be configured separately from the top gap 212'''. Similarly, the side shields 210A''' and 210B''' may be configured separately. In addition, the topology of the PMR head 200''' after formation of the top gap 212''' and in preparation for providing the top shield 214''' is quite flat. Consequently, the benefits of the PMR heads 200, 200', and 200" may also be achieved for the PMR head 200'''.

Thus, using the method 100, fabrication, performance, and reliability of PMR transducers 200, 200', 200", and 200''' may be improved.

We claim:

1. A method for providing a perpendicular magnetic recording (PMR) head comprising:
    forming a PMR pole having a bottom and a top wider than the bottom, the step of forming the PMR pole further including
        providing a resist layer;
        forming a trench in the resist layer, the trench having a trench bottom and a trench top wider than the trench bottom; and
        plating the at least one magnetic pole layer, a portion of the at least one magnetic pole layer residing in the trench;
    depositing a side gap over the PMR pole;
    providing a side shield on the side gap;
    performing a planarization step, the planarization step removing a portion of the side shield on the PMR pole;
    providing a top gap on the PMR pole, the top gap covering substantially at least the PMR pole; and
    providing a top shield.

2. The method of claim 1 wherein the pole forming further includes:
    providing a metal underlayer, the PMR pole layer residing on the metal underlayer.

3. The method of claim 2 wherein the pole forming further includes:
    forming a mask on the at least one magnetic pole layer;
    defining the PMR pole utilizing the mask.

4. The method of claim 1 wherein the pole forming further includes:

providing a planarization stop layer on the at least one magnetic pole layer.

5. The method of claim 4 wherein the planarization stop layer is a diamond-like carbon layer and wherein the pole forming further includes:
   performing a chemical mechanical planarization on the at least one magnetic pole layer.

6. The method of claim 4 wherein the pole forming further comprising:
   removing a remaining portion of the planarization stop layer before the top gap is formed.

7. The method of claim 1 wherein the top gap has a thickness and the side gap has a width, a ratio of the width to the thickness being greater than one.

8. The method of claim 7 wherein the ratio of the width to the thickness is at least two.

9. The method of claim 7 wherein the ratio of the width to the thickness is at least three.

10. The method of claim 1 wherein the side gap includes:
    providing at least one of an aluminum oxide layer, a silicon oxide layer, a silicon nitride layer, and a tantalum oxide layer.

11. A method for providing a perpendicular magnetic recording (PMR) head comprising:
    forming a PMR pole having a bottom and a top wider than the bottom;
    depositing a side gap over the PMR pole;
    providing a side shield on the side gap;
    performing a planarization step, the planarization step removing a portion of the side shield on the PMR pole;
    providing a top gap on the PMR pole, the top gap covering substantially at least the PMR pole; and
    providing a top shield;
    wherein the step of providing the pole further includes;
        providing a metal underlayer;
        providing a resist layer;
        forming a trench in the resist layer, the trench having a trench bottom and a trench top wider than the trench bottom; and
        plating the at least one magnetic pole layer, a portion of the at least one magnetic pole layer residing in the trench.

12. A method for providing a perpendicular magnetic recording (PMR) head comprising:
    forming a PMR pole having a bottom and a top wider than the bottom, the PMR pole forming including forming the PMR pole utilizing a pseudo-damascene process;
    depositing a side gap over the PMR pole, the side gap having a width;
    providing a side shield on the side gap;
    performing a planarization step, the planarization step removing a portion of the side shield on the PMR pole;
    providing a top gap on the PMR pole, the top gap covering the PMR pole, the top gap having a thickness, a ratio of the width of the side gap to the thickness of the top gap being at least two; and
    providing a top shield.

* * * * *